United States Patent [19]
Heim et al.

[11] Patent Number: 5,787,730
[45] Date of Patent: Aug. 4, 1998

[54] THERMAL SWING HELIUM PURIFIER AND PROCESS

[75] Inventors: Carl Joseph Heim; James Joseph Maloney, both of Amherst, N.Y.

[73] Assignee: Praxair Technology, Inc., Danbury, Conn.

[21] Appl. No.: 695,830

[22] Filed: Aug. 23, 1996

[51] Int. Cl.$^6$ ........................................... F25J 5/00
[52] U.S. Cl. ........................... 62/639; 95/130; 95/138; 62/22
[58] Field of Search ............... 62/608, 626, 639, 62/908, 923, 933; 95/107, 110, 115, 123, 127; 96/112, 123, 150

[56] References Cited

U.S. PATENT DOCUMENTS

| | | | |
|---|---|---|---|
| 2,940,271 | 6/1960 | Jackson | 62/31 |
| 3,407,614 | 10/1968 | Poska | 62/18 |
| 3,653,220 | 4/1972 | Foster et al. | 62/22 |
| 4,701,189 | 10/1987 | Oliker | 55/34 |
| 4,717,407 | 1/1988 | Choe et al. | 62/18 |
| 5,159,816 | 11/1992 | Kovak et al. | 62/22 |
| 5,336,300 | 8/1994 | Yoshino et al. | 95/96 |
| 5,601,634 | 2/1997 | Jain et al. | 95/114 |

*Primary Examiner*—Henry A. Bennett
*Assistant Examiner*—Pamela A. O'Connor
*Attorney, Agent, or Firm*—Bernard Lau

[57] ABSTRACT

A process and a system for producing helium from a helium-bearing feed gas that is purified in a cryogenic processing unit to produce cryogenic crude helium containing at least 10% helium. The cryogenic crude helium is directly introduced into a thermal swing helium refinery where it is refined. Refrigeration is supplied to the refinery by the cryogenic crude helium from the cryogenic processing unit.

19 Claims, 3 Drawing Sheets

5,787,730

1

THERMAL SWING HELIUM PURIFIER AND PROCESS

FIELD OF THE INVENTION

This invention relates to the purification of a light gas from heavier gas impurities and more particularly to purification of helium at cryogenic temperature in a thermal swing refinery.

BACKGROUND OF THE INVENTION

A variety of processes is known for producing helium. In one such process, crude helium (typically 50–80% purity) is produced in a cryogenic processing unit (CPU), such as a nitrogen rejection unit or other suitable cryogenic means. Helium is upgraded or concentrated from low content in a feed gas to a crude helium product stream. The crude helium is reheated in the CPU to recover refrigeration, compressed, and fed into a crude helium pipeline. The crude helium is then transported via pipeline to a helium refinery. There, the crude helium is once again cooled and further upgraded cryogenically, reheated within this cryogenic process, and then recovered at ambient temperatures for further processing in a non-cryogenic unit, such as a pressure swing adsorption (PSA) unit, to produce refined grade helium.

U.S. Pat. No. 3,407,614, discloses a process whereby crude helium containing 67% impurities is upgraded cryogenically to greater than 99%. This stream is then purified to essentially pure helium in a cryogenic, fixed bed charcoal adsorber. The system described by this reference requires cryogenic upgrading to very pure levels before refining in a fixed bed adsorber.

U.S. Pat. No. 5,159,816, discloses a process for upgrading a crude argon stream via cryogenic adsorption. However, the crude argon stream is already of high purity, containing only up to 0.8 mole % oxygen and 0.5 mole % nitrogen.

U.S. Pat. No. 4,717,407, teaches that refined grade helium can be produced using a combination of a membrane system, a non-membrane system such as a cryogenic process, and a PSA unit. There is process integration via recirculation of gas among these process steps. However, all of these recycles are performed at ambient temperatures, without thermal integration of the process steps. This approach requires high capital expenditure and utility cost for the additional compression.

In the above described processes, one or more steps of cooling and subsequent reheating of helium bearing gases introduce thermal inefficiencies in the processing of helium. Thus, utility cost make these processes less desirable.

OBJECTS OF THE INVENTION

It is therefore an object of the invention to provide a cost effective means of refining crude helium which could be produced on site, by using a cryogenic processing unit followed by a thermal swing refinery.

It is a further object of this invention to provide such a means of recovering helium, which thermally integrates the inherent refrigeration available within the cryogenic processing unit with the thermal swing refinery unit.

A still further object is to use the thermally integrated process to refine a crude helium stream provided from the cryogenic processing unit containing impurities which make up to about 90% of the total stream.

SUMMARY OF THE INVENTION

This invention comprises a process and a system for purifying helium at cryogenic temperatures wherein a feed gas is first upgraded in a cryogenic processing unit to make a cold crude helium stream comprising at least 10% helium. The cold crude helium is then purified in a thermal swing helium refinery unit which utilizes refrigeration from the cryogenic processing unit to produce refined helium.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

This invention may be accomplished by purifying a helium-bearing feed stream in a cryogenic processing unit (CPU) to produce a crude helium stream which is provided directly to a helium refinery. The crude helium stream supplies refrigeration to the refinery which produces refined helium. The invention does not include a refrigeration recovery step after processing in the CPU, rather, refrigeration is recovered at the end of the refinery step. Therefore, crude helium is provided at cryogenic temperature directly to the helium refinery. Additional refrigeration for the refinery is also available from the CPU as liquid nitrogen.

The CPU can be a nitrogen rejection unit, such as described in U.S. Pat. No. 5,026,408, which comprises a column and the attendant interconnecting equipment such as liquid pumps, phases separators, piping, valves and heat exchangers. The column may be a distillation, rectification or fractionation column which provides a contacting column or zone wherein liquid and vapor phases are countercurrently contacted to effect separation of a fluid mixture.

Figure 1:
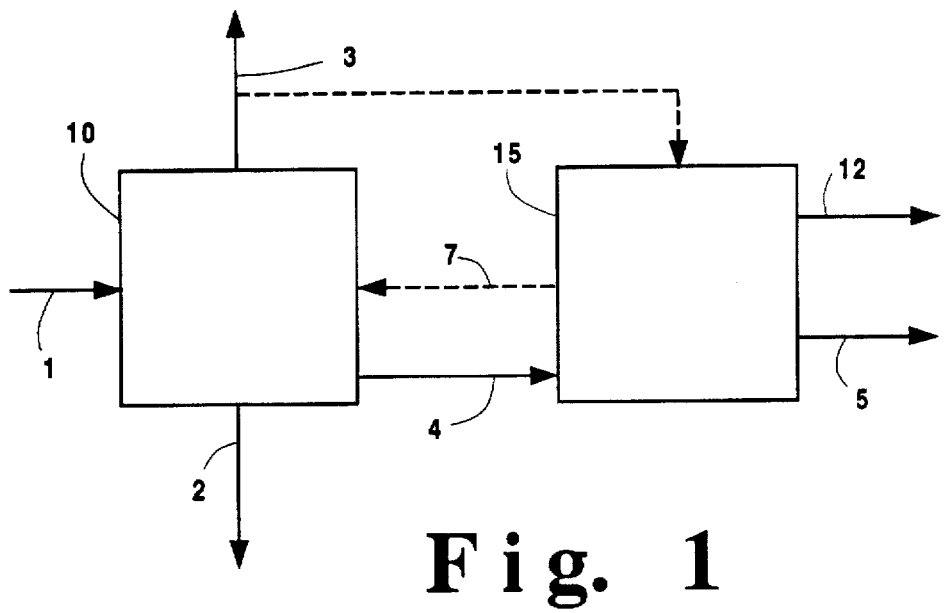
FIG. 1 is a simplified representational diagram of one embodiment of the invention wherein a cryogenic processing unit is integrated with a helium refinery.

In FIG. 1 a helium-bearing feed stream 1 is purified in a CPU 10 which produces a crude helium stream 4. Typically the helium-bearing feed stream 1 contains less than 1% helium with other components such as nitrogen, methane, ethane and/or propane. Leaving the CPU 10, a crude helium stream 4 contains at least 10% helium, preferably about 50% to about 80% helium. The crude helium stream 4 is at cryogenic temperature in the range of about 70 kelvin (K) to about 120 K preferably about 78 K to about 90 K. The pressure of the crude helium stream 4 can range from 20 pounds per square inch (psia) to greater than 1000 psia, with the preferred range being about 25 to about 400 psia.

Nitrogen stream 3 and methane product stream 2 are removed in the CPU 10 from the helium-bearing feed stream to produce crude helium 4. The crude helium 4 is supplied directly to a helium refinery 15, at cryogenic temperature. Refining the crude helium at cryogenic temperature takes advantage of the refrigeration from the cryogenic crude helium 4, thus maintaining a high thermal efficiency and avoiding a significant power penalty. Even greater thermal efficiency is achieved by the availability of nitrogen stream 3 from the CPU 10 to provide additional refrigeration to the refinery unit 15, when necessary.

When the crude helium 4 at cryogenic temperature and containing at least 10% helium is processed in a thermal swing helium refinery unit 15 nitrogen is removed in stream 12 and the crude helium is converted to refined helium 5 with about 1 part per million (ppm) nitrogen. A conduit 7 may be provided for transporting cold refined helium back from the helium refinery 15 to the CPU 10 for refrigeration recovery. Alternately, the cold refined helium 5 can be provided to a helium liquefier.

Figure 2:
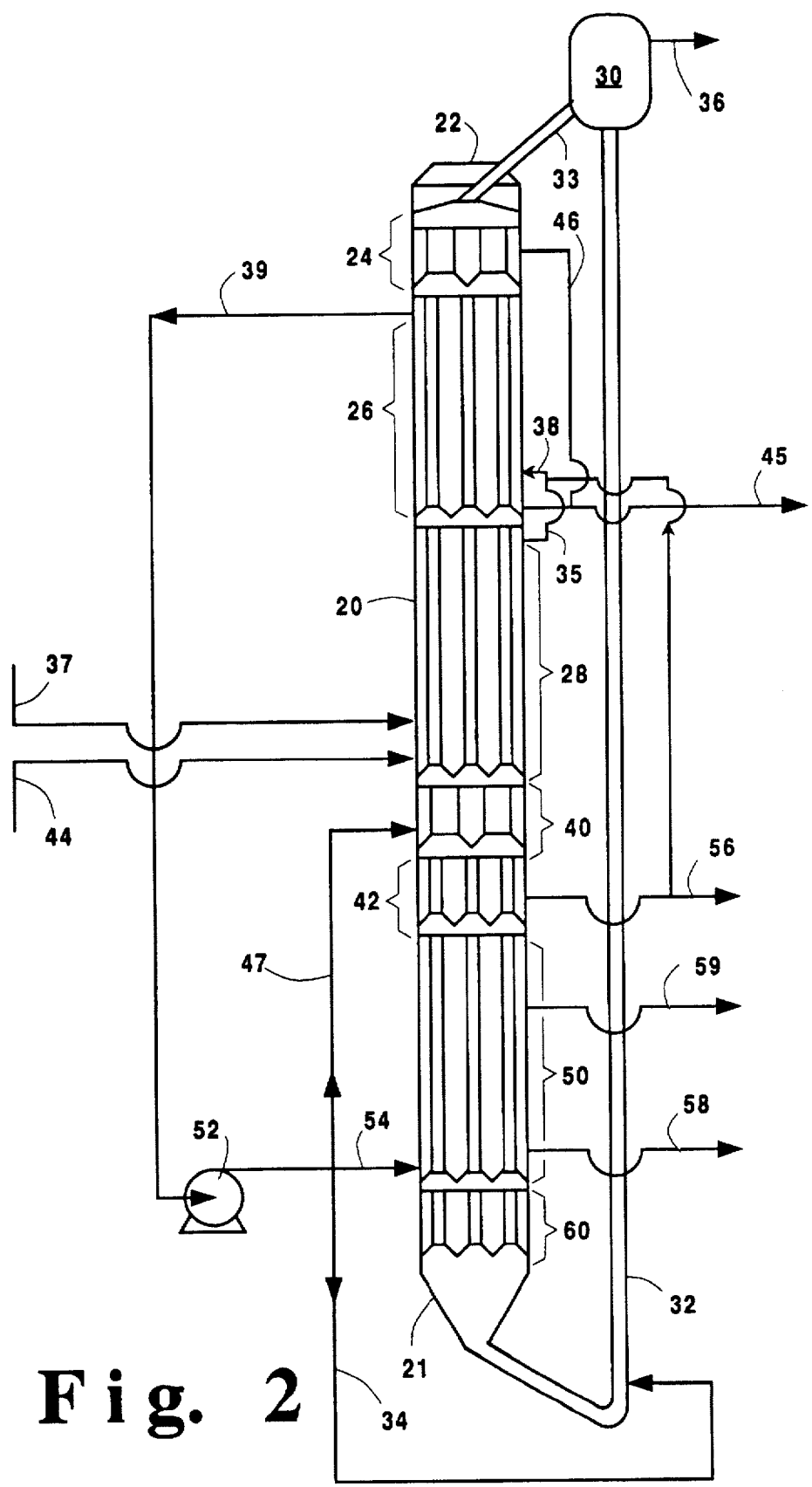
FIG. 2 is a process flow diagram of a preferred moving bed helium refinery and process whcih is useful in the practice of this invention.

The preferred refinery of the invention, is a thermal swing moving bed helium refinery unit 15' as shown for example in FIG. 2. A moving bed refinery facilitates refrigeration recovery which enables the size of the bed to be minimized and reduces the amount of heat loss and power consumption. Thus, processing of a lower purity crude helium becomes cost effective by using this type of refinery.

The moving bed helium refinery uses a suitable adsorbent for purifying helium such as beaded activated carbon (BAC), molecular sieve, silica gel or alumina. BAC is the preferred adsorbent because of its high nitrogen capacity and low attrition rate, which further reduces the total volume of adsorbent and the size of refinery equipment required. As a result, BAC as an adsorbent provides the further benefit of lower capital cost.

Moreover, there is a significant improvement in nitrogen removal by BAC at lower temperatures such as at the cryogenic temperature at which the crude helium is fed to the refinery in this invention. This temperature relationship is further discussed in reference to FIGS. 3A and 3B. At these temperatures, even less BAC is required and equipment can be sized accordingly, making this invention particularly desirable for on site use.

In FIG. 2 the moving bed helium refinery vessel comprises an adsorbent precooling section 26, an adsorber section 28, and a desorber section 50 where refrigeration recovery also occurs. Sections 24, 40, 42 and 60 are seal zones. The purpose of these seal zones is to prevent the gaseous components in one section from entering an adjacent section.

The adsorbent, BAC, is lifted and fed to the top 22 of the moving bed helium refinery vessel labeled generally as 20. Though this can be accomplished by mechanical or other means, the preferred means of the invention is using nitrogen gas as a lift-gas 34, to lift the BAC to the top, via a lift nozzle (not shown), and piping system 32. The BAC settles into a BAC separator 30 and flows via gravity through piping 33 to seal zone 24.

From seal zone 24, BAC flows as a plug flow moving bed through the BAC precooler 26. To further achieve efficiencies of thermal integration of the invention, desorbed nitrogen 56 is returned to the precooling section 26 and is introduced as stream 38. This nitrogen gas stream 38 at about 80 K is introduced to the precooler 26 to indirectly cool the BAC which leaves the precooler 26 and enters the adsorber 28 at or near the adsorption temperature of about 80 K.

In zone 28, BAC comes into direct contact with crude helium stream 44 which is at a temperature of about 80 K and pressure of about 35 psia. BAC adsorbs nitrogen from the crude helium and flows through seal zone 40 and 42 to desorption zone 50 where the BAC is heated against warmed nitrogen stream 54 and releases or desorbs the nitrogen. Cooling water 58 may also be used to heat the BAC in desorption zone 50. It is this nitrogen, desorbed in zone 50, that is removed in zone 42 as stream 56, and is introduced as stream 38 to the precooling zone 26 at the top of the refinery to efficiently precool the BAC to a temperature of about 78 K to about 120 K.

Additional liquid nitrogen 37 can also be provided, from the CPU for example, to indirectly remove heat generated by adsorption of the high concentration of nitrogen on BAC or for further indirect cooling of the BAC in zones 28 and 26. This heat of adsorption is transferred to the additional liquid nitrogen as heat of vaporization, resulting in vaporization of the nitrogen liquid which leaves adsorption zone 28 in nitrogen gas stream 35. Additional indirect cooling of BAC may be provided by nitrogen gas stream 35 which may be introduced to precooling zone 26 via nitrogen gas stream 38.

Nitrogen gas stream 38 may consist of desorbed nitrogen only from stream 56, or nitrogen gas from liquid nitrogen stream 37 which has been vaporized to nitrogen gas in stream 35 or a mixture of both streams 56 and 35. After being warmed by the incoming BAC, nitrogen gas in stream 38, leaves the BAC precooling zone 26 as stream 39, at an elevated temperature of about 273 K, approximately equal to the incoming BAC temperature. A booster blower 52 recycles the nitrogen gas to the desorption section 50 as stream 54 where it is used, as mentioned above, to heat the BAC to about 273 K allowing desorption of nitrogen from BAC.

The net additional refrigeration required by the process is kept to a minimum since the BAC is pre-cooled in zone 26 with nitrogen 38, 56. The nitrogen used for pre-cooling is provided to zone 26 after being removed from the helium-bearing stream and desorbed in zone 50. This nitrogen leaves zone 26 as stream 39 and is provided to zone 50 as boosted nitrogen stream 54 to remove refrigeration from the BAC which would otherwise be lost from the process through the piping as the BAC is lifted to the top of the refinery. In so doing, the BAC is warmed and the nitrogen is desorbed.

The nitrogen adsorption zone 28 may be staged, and interstage cooling could be provided for instance by liquid nitrogen or excess cold vapor from the CPU (CPU not shown in FIG. 2) may be added to remove the heat and maintain the adsorption temperature.

A refined helium product 45 leaves the vessel at low temperature of about 80 K to about 90 K and pressure of about 30 psia. A small amount of the product stream 45 is used as a sweep gas 46 in seal zone 24. The refined helium sweep gas 46 flows countercurrently to BAC in the seal zone 24 to remove any entrained nitrogen from the BAC. The sweep gas 46 flows toward the top 22 of the refinery 20 and leaves the system via seal leg piping 33 with the nitrogen lift gas 34 from the BAC separator 30 as stream 36. After pre-cooling, this stream 36 could be recycled to the crude helium feed for subsequent helium recovery.

Similarly, as the BAC flows downward through seal zone 40, nitrogen sweep gas 47, in countercurrent flow, removes entrained helium from BAC. The nitrogen displacement of the helium is enhanced by having the bottom of the seal zone at a higher pressure than the top. The resulting helium/nitrogen mixture together with the crude helium feed stream 44 flow upwardly through the nitrogen adsorption zone 28, for ultimate purification of the helium product. From seal zone 40, BAC flows into seal zone 42 creating a pressure drop which prohibits desorbed cold nitrogen, at about 80 deg, from re-entering the refinery unit 20 from nitrogen stream 56. A majority of the desorbed nitrogen along with the purge gas is swept out of the refinery vessel as stream 56.

Supplemental heat may be required to desorb the nitrogen from the BAC. Chilled water streams 58 and 59 are used to provide additional heat. The warmed BAC flows downward through seal zone 60 and into a cone 21 and then to a lift device 32 which uses nitrogen gas 34 to lift the BAC to the top and into the BAC separator 30.

The embodiment of the invention shown in FIG. 2 depicts shell and tube heat exchangers 26, 28 and 50 as the preferred heat transfer equipment. These heat exchangers are an integral part of the tower. However, this integration of the heat exchangers is not a requirement for the process, external heat exchangers could be used to achieve the same process results. Chilled water 58 and 59 is the preferred heat source in this embodiment in the desorption zone 50. Warm nitrogen, steam, or any other non-freezing fluid could be used for the same purpose.

Figure 3B:
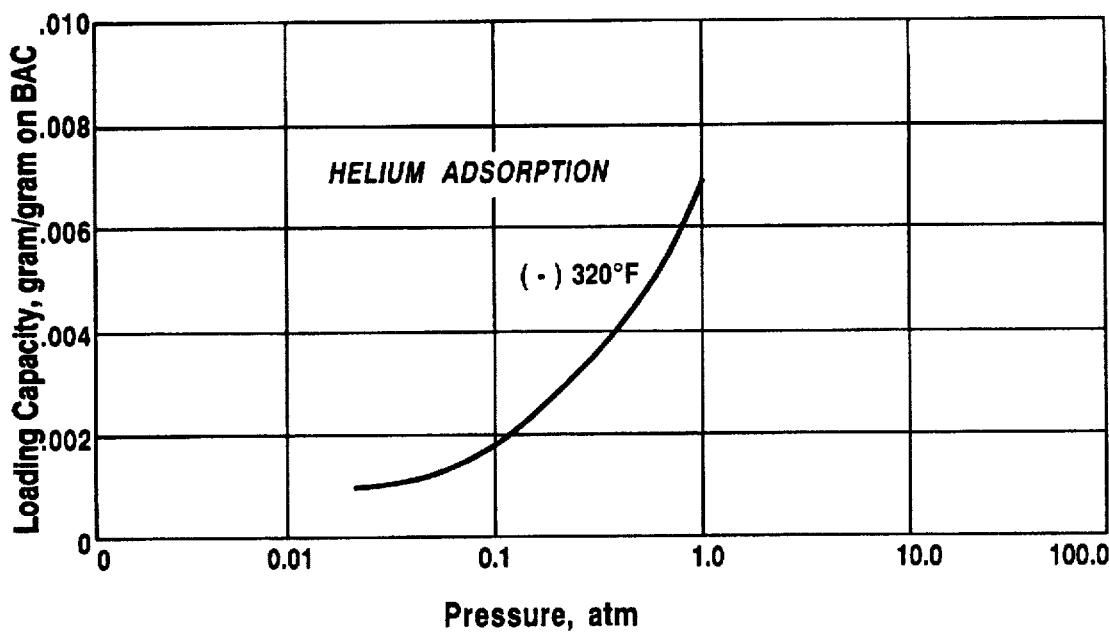
FIGS. 3A and 3B are graphs comparing the loading capacities for nitrogen and helium respectively on the preferred adsorbent for the practice of this invention.
Figure 3A:
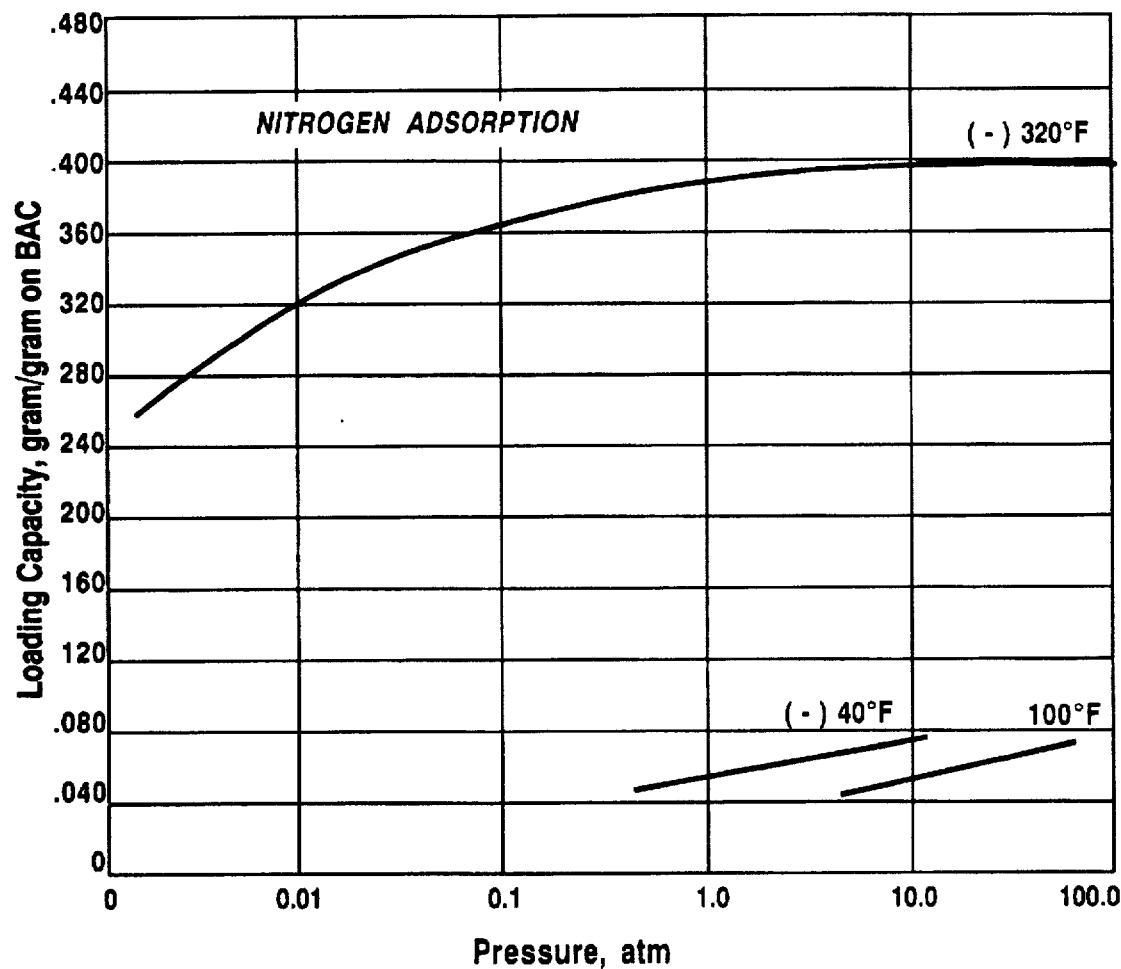

FIGS. 3A and 3B demonstrate the adsorptive properties of the preferred adsorbent, BAC, of the invention. The graphs are plotted as Loading Capacity (gram/gram of BAC, i.e. gram of adsorbed gas/gram of BAC) against Pressure (atmospheres). FIG. 3A shows that for nitrogen, the loading for the cryogenic temperatures, $-320°$ F., is approximately an order of magnitude greater than that at the ambient, and low temperatures $100°$ F. and $-40°$ F. respectively. This increase in loading allows for smaller equipment and lower operating utility costs.

In FIG. 3B, adsorption of helium at cryogenic temperatures is almost two orders of magnitude lower than that for nitrogen. This selectivity for nitrogen allows for a very efficient mode of separation. The data used to develop the curve was based on pure helium.

The refined helium product withdrawn from the process of this invention may contain hydrogen contaminant which is not removed by the process whether the refinery is a fixed bed or moving bed refinery. Removal of hydrogen may be accomplished after refining in an additional step such as by catalytic oxidation or by reaction with metallic oxide. The invention offers an advantage over the prior art if catalytic oxidation is used in that the helium is refined before the hydrogen removal. Therefore, the volume of gas to be treated for hydrogen removal is reduced since the nitrogen is already removed.

EXAMPLE 1

TABLE 1

| Stream No. | Stream | | | | | |
|---|---|---|---|---|---|---|
| | 1 | 2 | 3 | 4 | 5 | 12 |
| Flow, lb mole/hr | 1000.0 | 718.3 | 272.2 | 9.5 | 4.75 | 4.75 |
| Temperature, °K. | 200 | 190.000 | 190 | 80 | 80–90 | 80–90 |
| Pressure, psia | 400 | 120 | 25 | 35 | 30 | 30 |
| Composition, mole % | | | | | | |
| Helium | 0.50 | 0.00 | 0.08 | 50.00 | ~100.00 | ~0.00 |
| Nitrogen | 30.00 | 4.00 | 97.92 | 49.85 | ~0.00 | 99.700 |
| Methane | 65.50 | 90.43 | 2.00 | 0.15 | 0.00 | 0.30 |
| Ethane | 3.00 | 4.18 | 0.00 | 0.00 | 0.00 | 0.00 |
| Propane | 1.00 | 1.39 | 0.00 | 0.00 | 0.00 | 0.00 |

Table I provides the stream numbers as well as composition, flow rates, pressure, and temperatures for the embodiment of FIG. 1. In this example, the helium-bearing feed stream 1, containing about 0.5 mole % helium is supplied to a CPU at about 200 K and 400 psia at a flow rate of 1000 pound mole per hour (lbmole/hr). Contaminants methane and nitrogen are removed as streams 2 (90.4% methane) and 3 (97.9% nitrogen), respectively. The crude helium stream 4 containing approximately 50% helium (substantially all of the helium from the helium-bearing feed) and 50% nitrogen, with a trace of methane, is provided to the refinery at a cryogenic temperature of 80 K. Nitrogen along with trace amounts of methane are removed in stream 12. Product helium leaves the refinery as stream 5 with substantially 100% helium at a temperature of about 78–90 K.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A process for producing helium comprising:
   purifying a helium-bearing feed gas in a cryogenic processing unit to produce cryogenic crude helium comprising at least 10% helium;
   providing said cryogenic crude helium directly to a thermal swing helium refinery;
   providing refrigeration for said thermal swing helium refinery by said cryogenic processing unit; and
   refining said crude helium in said thermal swing helium refinery at cryogenic temperature to produce refined helium.

2. The process of claim 1 wherein the steps for providing said cryogenic crude helium, providing refrigeration and refining said crude helium take place in a moving bed refinery.

3. The process of claim 2 further comprising removing hydrogen by catalytic oxidation.

4. The process of claim 2 further comprising removing hydrogen by metallic oxide.

5. The process of claim 1 wherein the step for purifying helium-bearing feed gas comprises helium and at least one of nitrogen, methane, ethane and propane.

6. The process of claim 5 wherein the step for providing at least a portion of said refrigeration to said thermal swing helium refinery is via liquid nitrogen which is removed from the helium-bearing feed gas in said cryogenic processing unit.

7. The process of claim 5 wherein the steps for providing said cryogenic crude helium, providing refrigeration and refining said crude helium take place in a thermal swing helium refinery unit which uses an adsorbent which removes nitrogen from said cryogenic crude helium when the adsorbent and the cyrogenic crude are in direct contact in said helium refinery.

8. The process of claim 7 wherein the steps for providing said cryogenic crude helium, providing refrigeration and refining said crude helium take place in a thermal swing helium refinery which uses beaded activated carbon.

9. The process of claim 7 wherein the steps for providing said cryogenic crude helium, providing refrigeration and refining said crude helium take place in said helium refinery having at least one precooling zone, at least one adsorption zone, and at least one desorption zone and wherein the adsorbent is precooled in the precooling zone by nitrogen desorbed in the desorption zone, to a temperature of about 78 K to about 120 K before directly contacting said cryogenic crude helium in said helium refinery.

10. The process of claim 1 wherein the step for providing said refrigeration to said thermal swing helium refinery is via said cryogenic crude helium which is produced in said cryogenic processing unit.

11. The process of claim 1 wherein the step for purifying produces said cryogenic crude helium which contains about 50% to about 80% helium.

12. The process of claim 11 wherein said purifying and said refining steps are both at cryogenic temperatures of about 78 K to about 90 K.

13. The process of claim 1 wherein said purifying and said refining steps are both at cryogenic temperatures of about 70 K to about 120 K.

14. A system for producing helium comprising:
- a cryogenic processing unit for purifying a helium-bearing feed gas to produce cryogenic crude helium comprising at least 10% helium;
- a thermal swing helium refinery unit for refining said cryogenic crude helium to produce refined helium, said thermal swing helium refinery unit having a precooling zone, an adsorption zone, and a desorption zone;
- a first conduit for providing cryogenic crude helium from the cryogenic processing unit to the adsorption zone of the thermal swing helium refinery unit.

15. The system of claim 14 further comprising a second conduit for providing refrigeration via nitrogen desorbed in desorption zone of the helium refinery to the precooling zone of the helium refinery.

16. The system of claim 14 further comprising a third conduit for providing refrigeration via nitrogen from the cryogenic processing unit to the helium refinery.

17. The system of claim 14 wherein the thermal swing helium refinery unit is a moving-bed refinery unit.

18. The system of claim 14 further comprising a conduit for providing cold refined helium from the thermal swing helium refinery unit to the cryogenic processing unit for refrigeration recovery.

19. The system of claim 14 further comprising a helium liquefier.

* * * * *